United States Patent
Mun et al.

(10) Patent No.: US 9,685,282 B2
(45) Date of Patent: Jun. 20, 2017

(54) DOOR INTERLOCK DEVICE FOR VACUUM CIRCUIT BREAKER

(71) Applicant: LSIS CO., LTD., Anyang-si, Gyeonggi-do (KR)

(72) Inventors: Seung Hwan Mun, Cheongju-si (KR); Kil Young Ahn, Daejeon (KR); Dae Soo Han, Cheongju-si (KR); Seung Pil Yang, Cheongju-si (KR)

(73) Assignee: LSIS CO., LTD., Anyang-si (KR)

(*) Notice: Subject to any disclaimer, the term of this patent is extended or adjusted under 35 U.S.C. 154(b) by 46 days.

(21) Appl. No.: 14/743,923

(22) Filed: Jun. 18, 2015

(65) Prior Publication Data

US 2016/0126028 A1 May 5, 2016

(30) Foreign Application Priority Data

Oct. 31, 2014 (KR) .................. 10-2014-0150524

(51) Int. Cl.
*H01H 9/20* (2006.01)
*H02B 11/133* (2006.01)
*H02B 11/24* (2006.01)

(52) U.S. Cl.
CPC ............. *H01H 9/20* (2013.01); *H02B 11/133* (2013.01); *H02B 11/24* (2013.01)

(58) Field of Classification Search
CPC .......... H01H 33/48; H01H 33/66; H01H 9/20; H02B 11/167; H02B 11/133; H02B 3/00; H02B 11/24

(Continued)

(56) References Cited

U.S. PATENT DOCUMENTS 8,481,875 B2 * 7/2013 Park ..................... H02B 11/133
                                                    200/50.27
8,604,368 B2 * 12/2013 Kim ....................... H02B 11/24
                                                    200/50.22

(Continued)

FOREIGN PATENT DOCUMENTS

CN    202978073    6/2013
CN    203166374    8/2013

(Continued)

OTHER PUBLICATIONS

Internet Archive Wayback Machine, "Bushing," http://brokentractor.com/case_industrial_parts_loader_case_loader_bellcrank.asap, Oct. 2014, 2 pages.

(Continued)

*Primary Examiner* — Edwin A. Leon
(74) *Attorney, Agent, or Firm* — Lee, Hong, Degerman, Kang & Waimey PC

(57) ABSTRACT

The present invention relates to a door interlock device for a vacuum circuit breaker, and more particularly, a door interlock device for a vacuum circuit breaker, which is operable in cooperation with an operation of a cradle shutter. A door interlock device for a vacuum circuit breaker according to one embodiment disclosed herein includes a pressing unit that is provided on one end portion of a shutter lever driving a terminal shutter of a cradle, a driving force transfer unit that is rotatably or slidably installed on a cradle side frame, the driving force transfer unit performing a rotary motion or a sliding motion by a force applied from the pressing unit, and a sliding member that is configured to lock or unlock a door lock plate in response to a driving force transferred from the driving force transfer unit.

6 Claims, 18 Drawing Sheets

(58) Field of Classification Search
 USPC ......... 200/50.23, 50.12, 50.01–50.02, 50.17,
  200/50.21–50.22, 50.24–50.27
 See application file for complete search history.

(56) References Cited

U.S. PATENT DOCUMENTS

| | | | | |
|---|---|---|---|---|
| 8,710,390 B2* | 4/2014 | Kim | ................. | H02B 11/133 |
| | | | | 218/140 |
| 8,878,088 B2* | 11/2014 | Webb | ................. | H02B 11/10 |
| | | | | 200/337 |
| 2012/0217223 A1 | 8/2012 | Kim | | |

FOREIGN PATENT DOCUMENTS

| | | |
|---|---|---|
| CN | 203774662 | 8/2014 |
| KR | 100451372 | 10/2004 |
| KR | 20060112280 | 10/2006 |
| KR | 10-0957493 | 5/2010 |
| KR | 101168083 | 7/2012 |

OTHER PUBLICATIONS

Korean Intellectual Property Office Application Serial No. 10-2014-0150524, Office Action dated Apr. 29, 2016, 4 pages.
European Patent Office Application Serial. No. 15173243.5, Search Report dated Mar. 3, 2016, 8 pages.
The State Intellectual Property Office of the People's Republic of China Application Serial No. 201510469080.X, Office Action dated Apr. 19, 2017, 7 pages.

* cited by examiner

DOOR INTERLOCK DEVICE FOR VACUUM CIRCUIT BREAKER

CROSS-REFERENCE TO RELATED APPLICATION

Pursuant to 35 U.S.C. §119(a), this application claims the benefit of earlier filing date and right of priority to Korean Patent Application No. 10-2014-0150524, filed on Oct. 31, 2014, the contents of which are all hereby incorporated by reference herein in its entirety.

BACKGROUND OF THE DISCLOSURE

1. Field of the Disclosure

This specification relates to a door interlock device for a vacuum circuit breaker, and more particularly, a door interlock device for a vacuum circuit breaker, which is operable in cooperation with an operation of a cradle shutter.

2. Background of the Disclosure

In general, a vacuum circuit breaker is a type of circuit breaker, which is installed in a high-pressure power system to break a circuit upon an occurrence of dangerous situations, such as short-circuit or overcurrent, so as to protect the power system. The vacuum circuit breaker is designed by utilizing high insulating performance and arc extinguishment in a vacuum state. That is, the vacuum circuit breaker is a product of protecting lives and load devices by breaking a circuit in a vacuum interrupter (VI) provided therein in a vacuum-extinguishing manner by an external relay when a fault current, such as overcurrent, short-circuit, earth fault current or the like, is generated on a super-high-pressure/high-pressure power distribution line.

The vacuum circuit breaker is generally installed in a switchboard in which various electric devices including a circuit breaker are placed and managed for operation or control of a power generator and a substation, an operation of a motor and the like. The vacuum circuit breaker is used by being accommodated in a cradle fixed to the switchboard.

The cradle has therein a service position (location) at which a terminal of the vacuum circuit breaker is connected to a terminal of the cradle to allow for the supply of voltage and current, and a test position at which the terminal of the vacuum circuit breaker is disconnected from the terminal of the cradle so as to allow only for testing an operation of the circuit breaker.

As the prior art of the door interlock device for the vacuum circuit breaker, the Korean Registration Patent No. 10-1168083 titled 'Door lock device and circuit breaker using the same' will be referred to. FIGS. 1A to 3 illustrate a technology disclosed in the prior document.

FIG. 1A is a view illustrating an open state of a door at a test position of a vacuum circuit breaker according to the related art, FIG. 1B is a view illustrating a closed state of the door at a service position of the vacuum circuit breaker according to the related art, and FIG. 2 is a detailed view of a door interlock device of FIG. 1B.

A door assembly 110 is attached to a cradle 100. A vacuum circuit breaker main body 200 may be inserted into the cradle 100. The vacuum circuit breaker main body 200 is loaded on a truck 210 to be conveyed to the service position or the test position or drawn out of the cradle 100. When the vacuum circuit breaker main body 200 is located at the service position, a main body terminal 201 of a main circuit part 205 is coupled to a cradle terminal 101 such that high voltage and current are applied.

An interlock plate 111 is installed on the door assembly 110 to be rotatable centering on a rotation shaft 113, and a guide groove 112 is formed at the interlock plate 111.

A door interlock device 300 is provided in an upper portion of the cradle 100 to fix the door assembly 110.

Hereinafter, a detailed configuration of the door interlock device 300 will be described with reference to FIG. 2. A rotation shaft 301 is provided on one side portion of a base plate 305. A rotation plate 302 in a shape like an alphabet "L" is coupled to the rotation shaft 301. One end portion 302a of the rotation plate 302 extends downward, and a locking bar 303 is provided on the other end portion 302b of the rotation plate 302. A return spring 304 is installed on the locking bar 303.

FIG. 3 illustrates the vacuum circuit breaker main body 200 according to the related art. An interlock driving plate 203 is provided on an upper portion of a front cover 202 of the vacuum circuit breaker main body 200.

The door interlock device according to the related art operates in the following manner.

A key is inserted into a key lock 114 of the door assembly 110 and turns the interlock plate 111 in a counterclockwise direction for release, thereby closing the door assembly 110 on the cradle 100.

The truck 201 is driven to convey the vacuum circuit breaker main body 200 to the service position. When the vacuum circuit breaker main body 200 is completely moved to the service position, the interlock driving plate 203 of the front cover 202 pushes the one end portion 302a of the rotation plate 302 of the door interlock device 300. Accordingly, the rotation plate 302 is rotated centering on the rotation shaft 301. In response to the rotation of the rotation plate 302, the locking bar 303 provided on the other end portion 302b of the rotation plate 302 is moved downward.

During this, the interlock plate 111 is rotated and thus the guide groove 111 is inserted into (or engaged with) the locking bar 303. Since the locking bar 303 fixes the interlock plate 111 coupled to the door assembly 110, the opening of the door assembly 110 is restricted (the door assembly 110 is locked).

For unlocking the door assembly 110, the key (not illustrate) is inserted into the key lock 114 and rotates the interlock plate 111 in a clockwise direction so as to release the interlock plate 111 from the locking bar 303. Accordingly, the door assembly 100 can be open.

However, the operation of the door interlock device according to the related art is performed through such complicated sequential processes of releasing the interlock plate 111 using the key, closing the door assembly 110, conveying the vacuum circuit breaker main body 200, and closing the interlock plate 111 again. When one of those complicated processes is omitted or the operating order of those processes changes, the locking of the door assembly 110 may not be carried out properly and related components may be damaged. This may result in operator's inconvenience in view of the requirement for the operator's attention.

In addition, the interlock device 300 operates only when the vacuum circuit breaker main body 200 is located at the service position. Therefore, the prevention of opening (or the locking of) the door assembly 110 is failed during insertion and withdrawal of the vacuum circuit breaker main body 200.

SUMMARY OF THE DISCLOSURE

Therefore, to obviate the aforementioned problems of the related art, an aspect of the detailed description is to provide a door interlock device for a vacuum circuit breaker, capable of automatically preventing a door from being opened when a vacuum circuit breaker main body is conveyed to a service position.

Another aspect of the detailed description is to provide a door interlock device for a vacuum circuit breaker, capable of preventing opening of a door even during insertion or withdrawal of a vacuum circuit breaker main body.

To achieve these and other advantages and in accordance with the purpose of this specification, as embodied and broadly described herein, there is provided a door interlock device for a vacuum circuit breaker, the device including a pressing unit that is provided on one end portion of a shutter lever driving a terminal shutter of a cradle, a driving force transfer unit that is rotatably or slidably installed on a cradle side frame so as to perform a rotary motion or a sliding motion by a force applied from the pressing unit, and a sliding member that is configured to lock or unlock a door lock plate in response to a driving force transferred from the driving force transfer unit.

Here, the pressing unit may protrude from one side of the shutter lever, and be provided with a bushing or a roller.

Also, the driving force transfer unit may be provided with a pressing unit operation recess in which the pressing unit is movably inserted.

The driving force transfer unit may include a first connection member that is configured to perform a rotary motion or a sliding motion by the force applied from the pressing unit, and a second connection member that is rotatably provided on the cradle side frame, and has one end connected to the first connection member and the other end connected to the sliding member.

The first connection member may be provided with a plurality of horizontal sliding holes in which supporting members are slidably inserted to support the first connection member, and the supporting members may be fixed to the cradle side frame.

The first connection member may be provided with a first vertical sliding hole to which one end of the second connection member is slidably coupled.

The sliding member may be provided with a second vertical sliding hole to which the other end of the second connection member is slidably coupled.

The sliding member may perform a linear reciprocal motion, and the door lock plate may be provided with a locking recess that restricts a movement of the door lock plate when a locking piece formed on one end of the sliding member is inserted therein.

A door interlock device for a vacuum circuit breaker according to one embodiment of the present invention may receive a driving force applied from a cradle shutter, and thus a door can automatically be locked upon an operation of inserting a circuit breaker main body. Such locking operation may be carried out immediately when the vacuum circuit breaker main body is inserted. This may prevent the door from being open even during the insertion.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 12B and 12C are lateral views of a door assembly in accordance with one embodiment of the present invention, in which FIG. 12B illustrates a closed state of a door handle, and FIG. 12B illustrates an open state of the door handle.

DETAILED DESCRIPTION OF THE DISCLOSURE

Description will now be given of preferred configurations of the present invention, with reference to the accompanying drawings. However, those preferred embodiments of the present invention are merely illustrative to help those skilled in the art easily practice the invention, but should not be construed to limit the technical scope of the present invention.

Figure 1A:
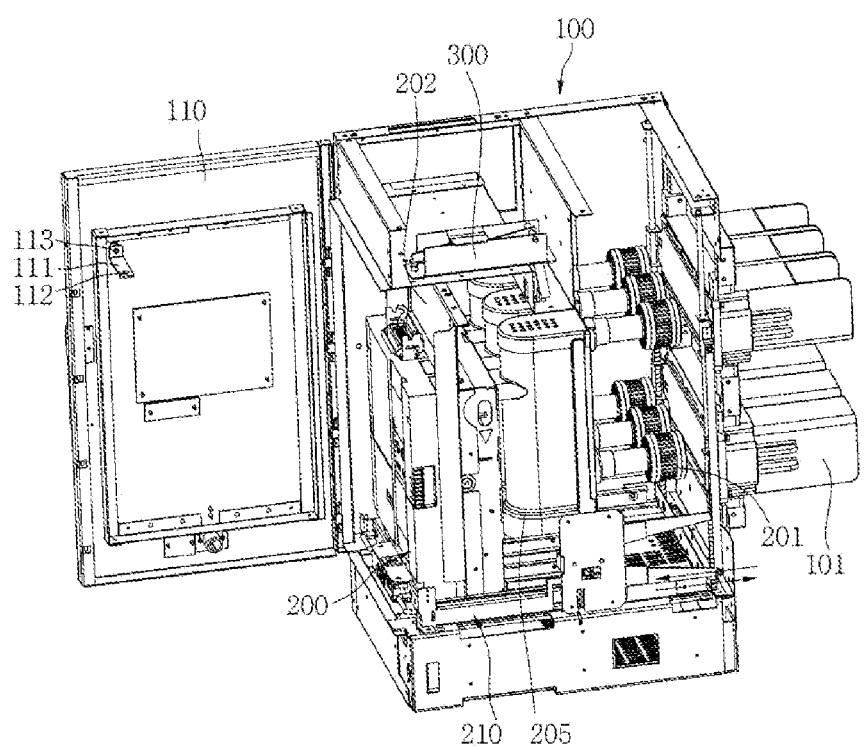
FIG. 1A is a view illustrating an open state of a door at a test position of a vacuum circuit breaker according to the related art.
Figure 1B:
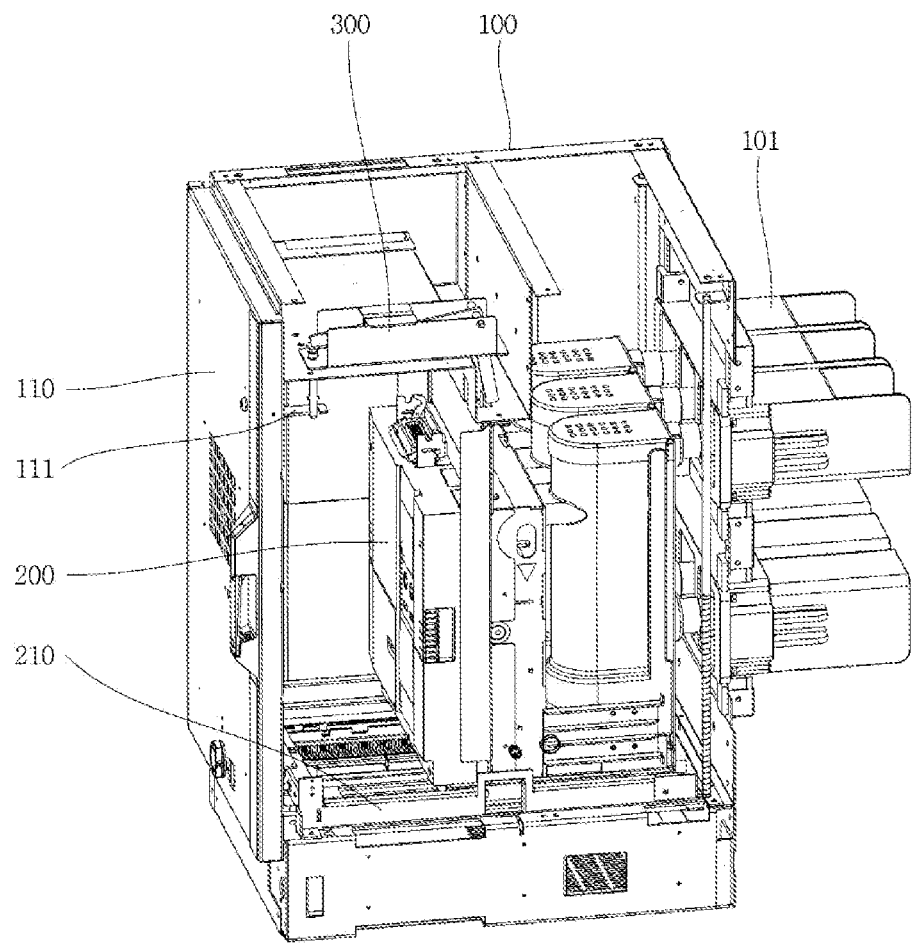
FIG. 1B is a view illustrating a closed state of the door at a service position of the vacuum circuit breaker according to the related art.
Figure 2:
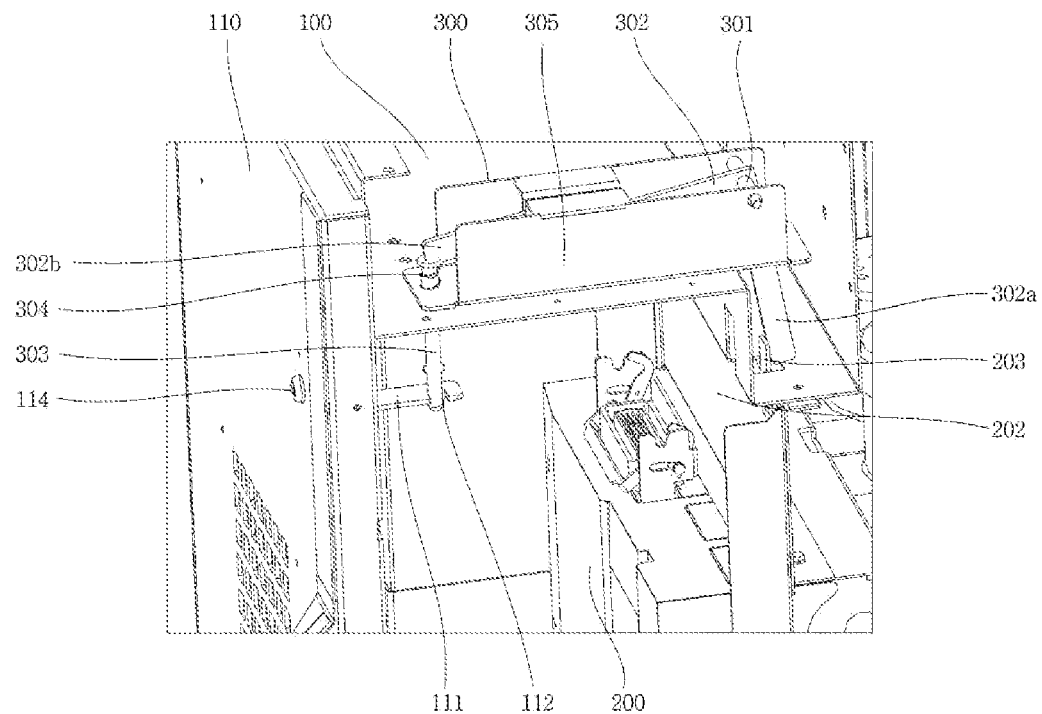
FIG. 2 is a detailed view of a door interlock device of FIG. 1B.
Figure 3:
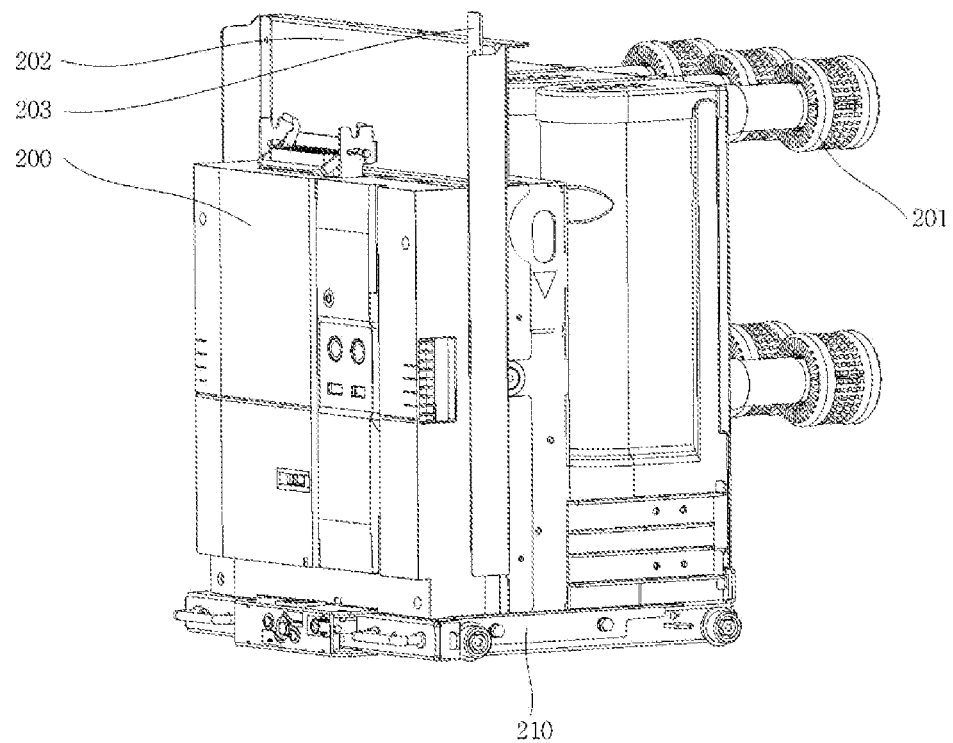
FIG. 3 is a perspective view of a vacuum circuit breaker main body according to the related art.
Figure 4:
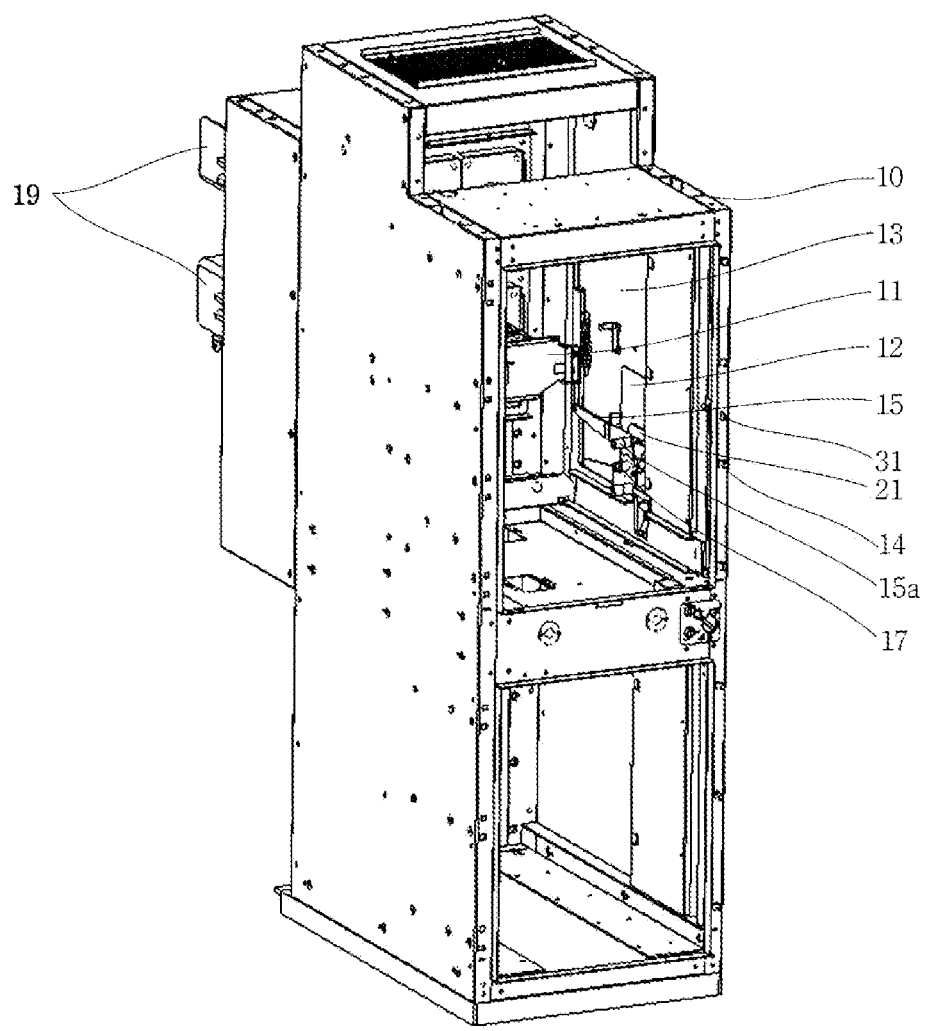
FIG. 4 is a perspective view illustrating a cradle of a vacuum circuit breaker in accordance with one embodiment of the present invention.
Figure 5:
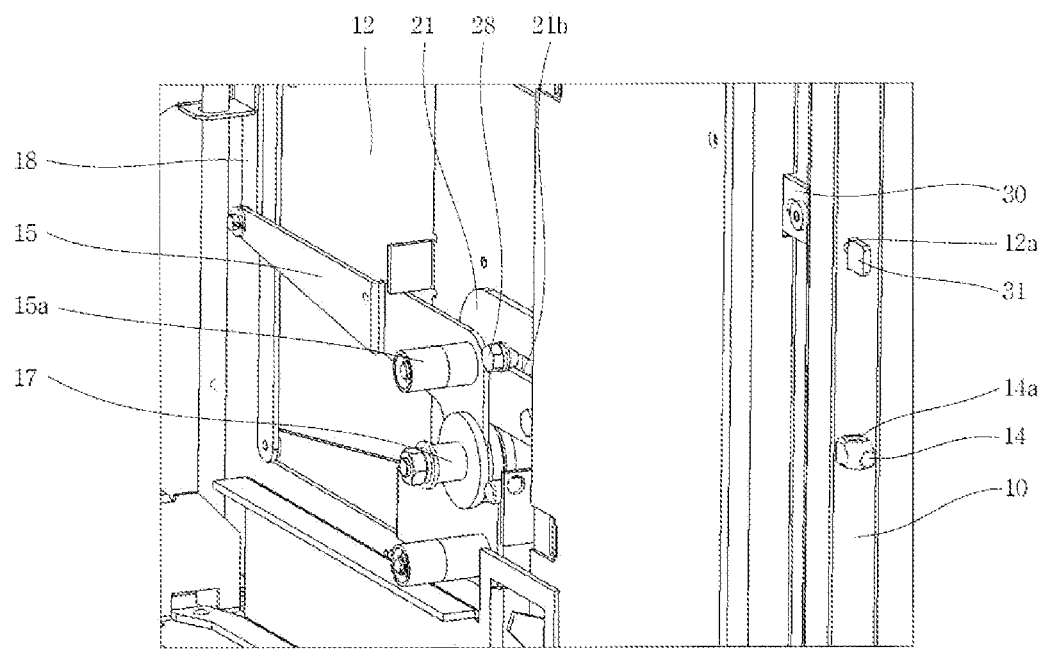
FIG. 5 is a detailed view of a shutter part in FIG. 4.
Figure 6:
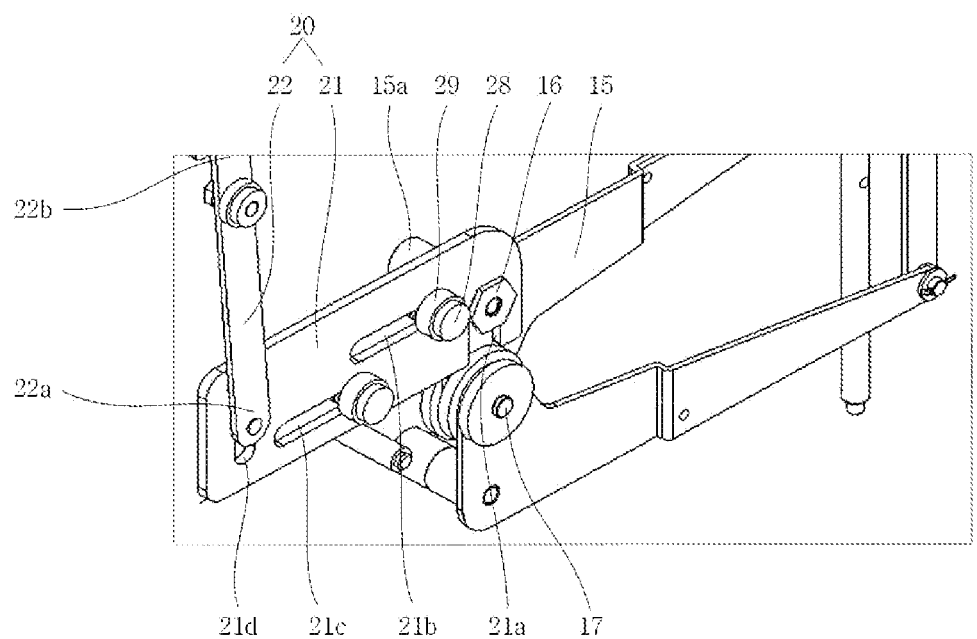
FIG. 6 is an outer perspective view of the shutter part illustrated in FIG. 5 when viewed from an outside of the cradle.
Figure 7:
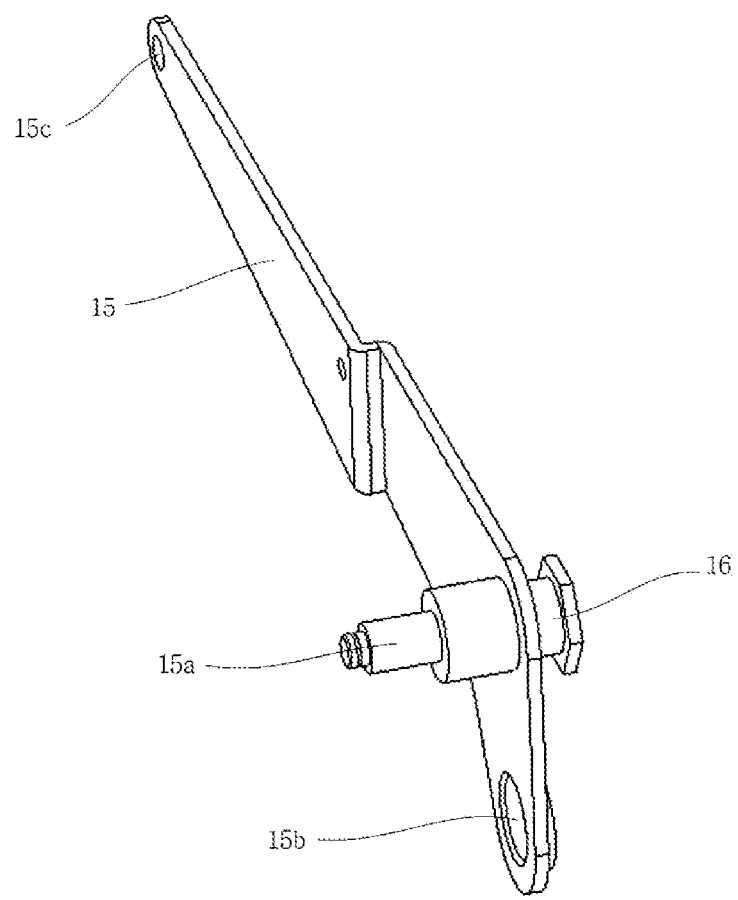
FIG. 7 is a perspective view of a shutter lever of FIG. 4.

FIG. 4 is a perspective view illustrating a cradle of a vacuum circuit breaker in accordance with one embodiment of the present invention, FIG. 5 is a detailed view of a shutter part in FIG. 4, FIG. 6 is an outer perspective view of the shutter part illustrated in FIG. 5 when viewed from an outside of the cradle, and FIG. 7 is a perspective view of a shutter lever of FIG. 4.

Figure 8A:
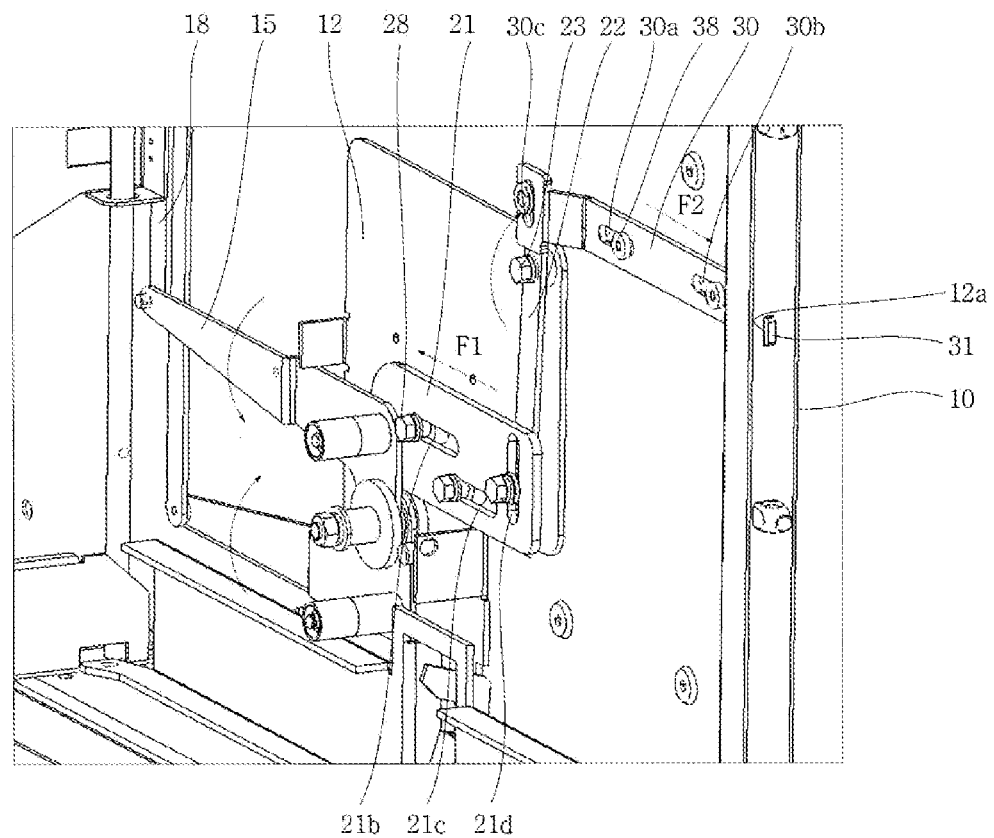
FIGS. 8A and 8B are operation state views, which illustrate a state that the circuit breaker main body is located at a test position and a state that the circuit breaker main body is located at a service position, respectively.
Figure 8B:
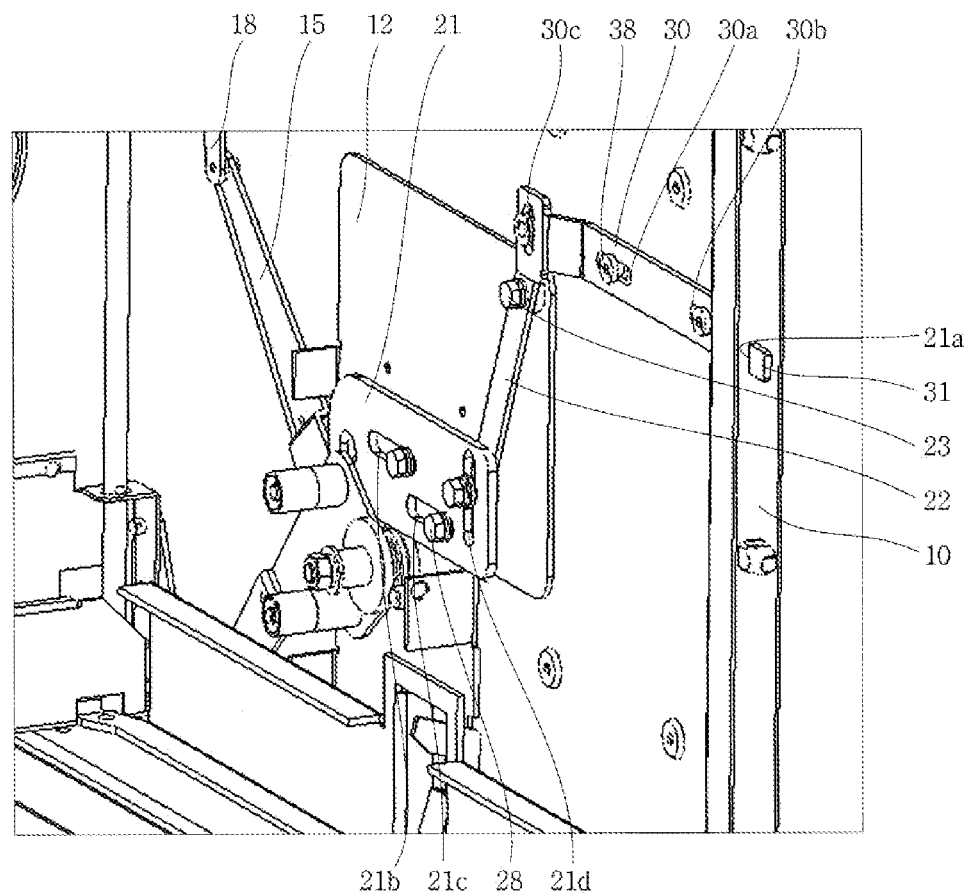
Figure 9A:
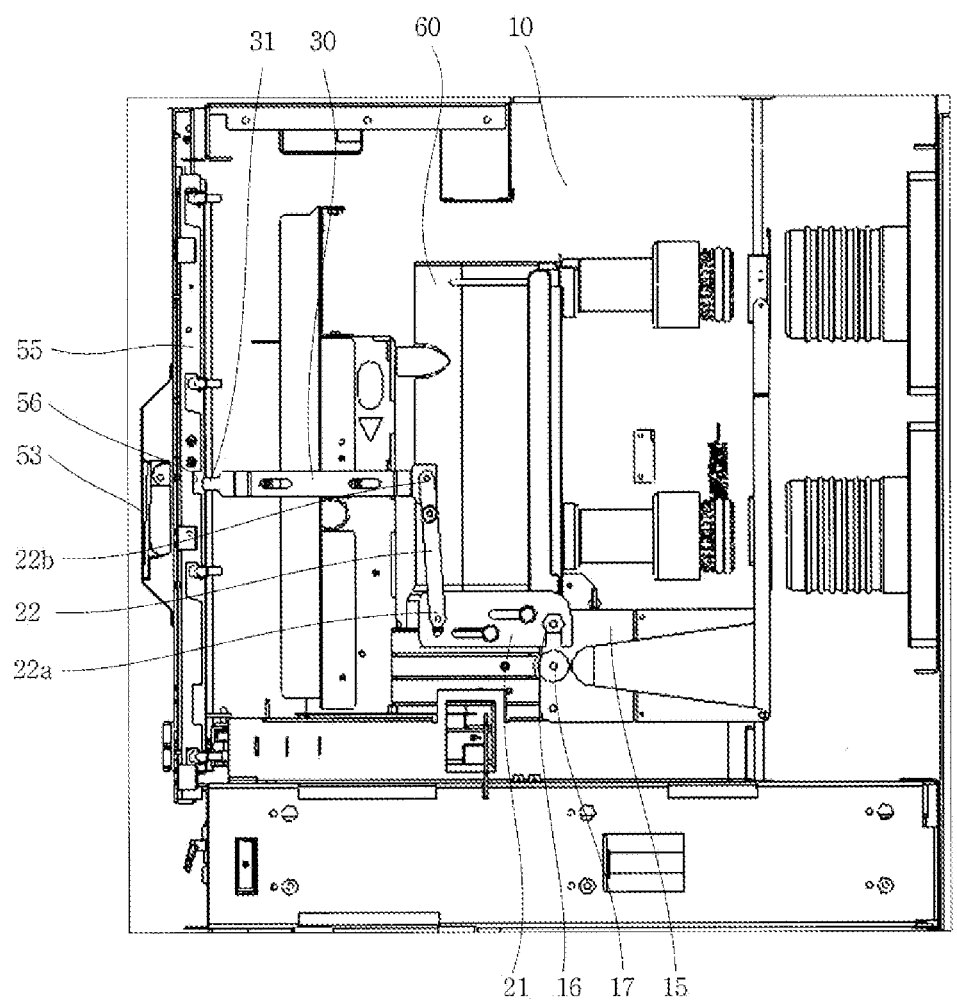
FIGS. 9A and 9B are lateral views of the operation states illustrated in FIGS. 8A and 8B.
Figure 9B:
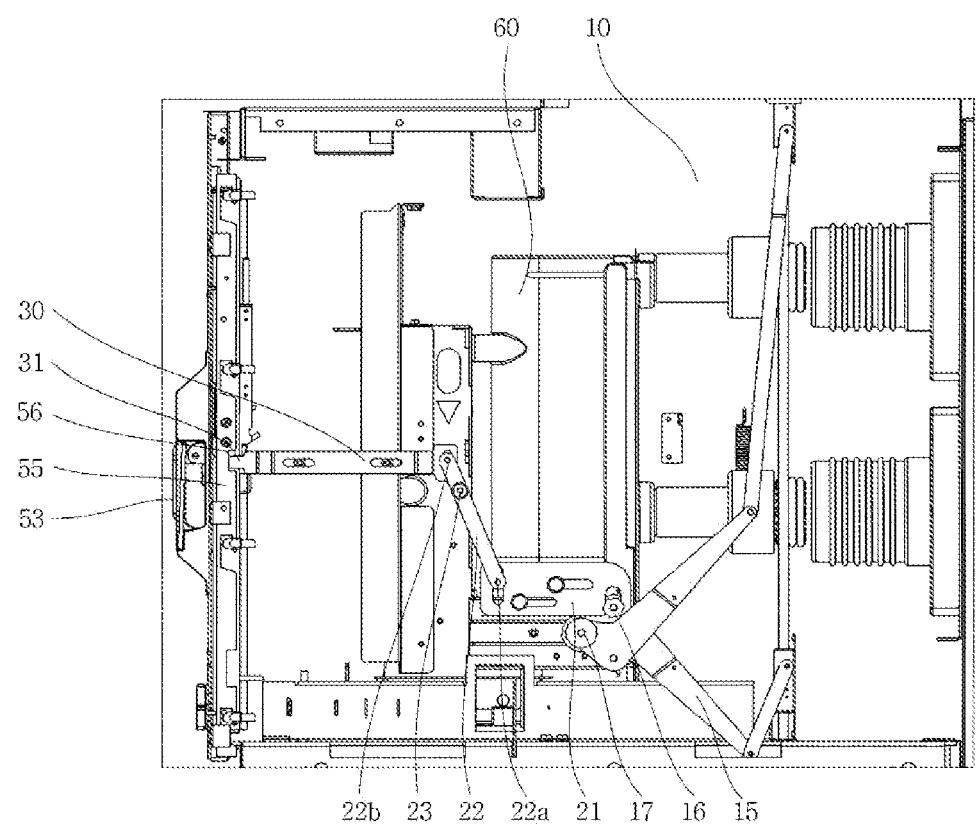
Figure 10A:
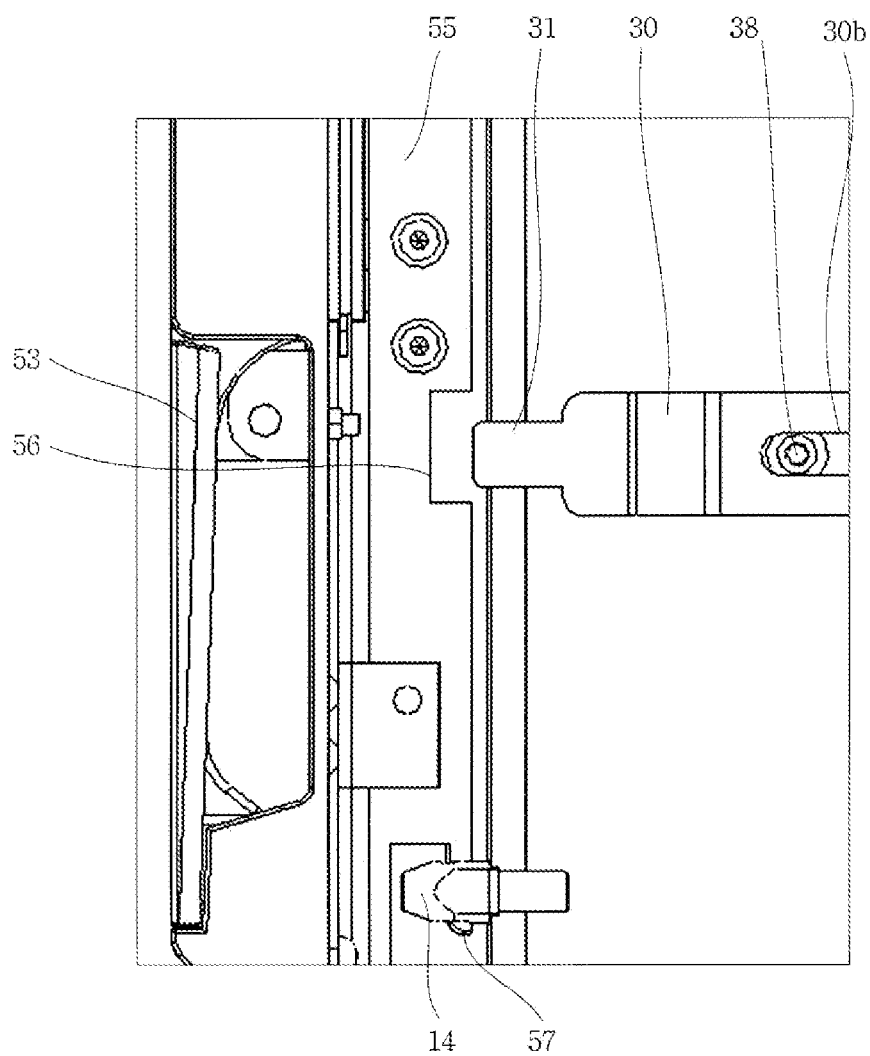
FIGS. 10A and 10B are detailed views of a locking pin part in FIGS. 9A and 9B, respectively.
Figure 10B:
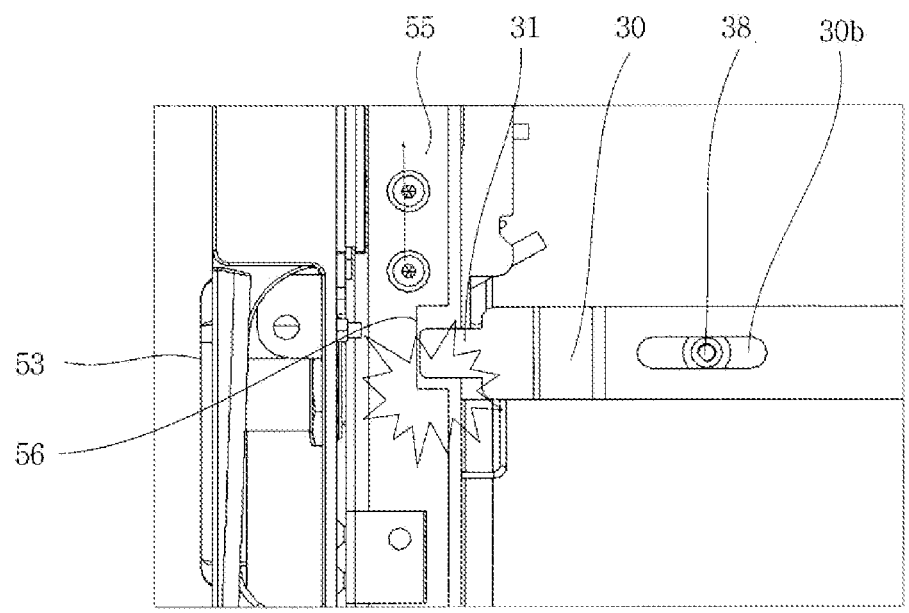

FIGS. 8A and 8B are operation state views, which illustrate a state that the circuit breaker main body is located at a test position and a state that the circuit breaker main body is located at a service position, respectively, FIGS. 9A and 9B are lateral views of the operation states illustrated in FIGS. 8A and 8B, and FIGS. 10A and 10B are detailed views of a locking pin part in FIGS. 9A and 9B, respectively.

Figure 12A:
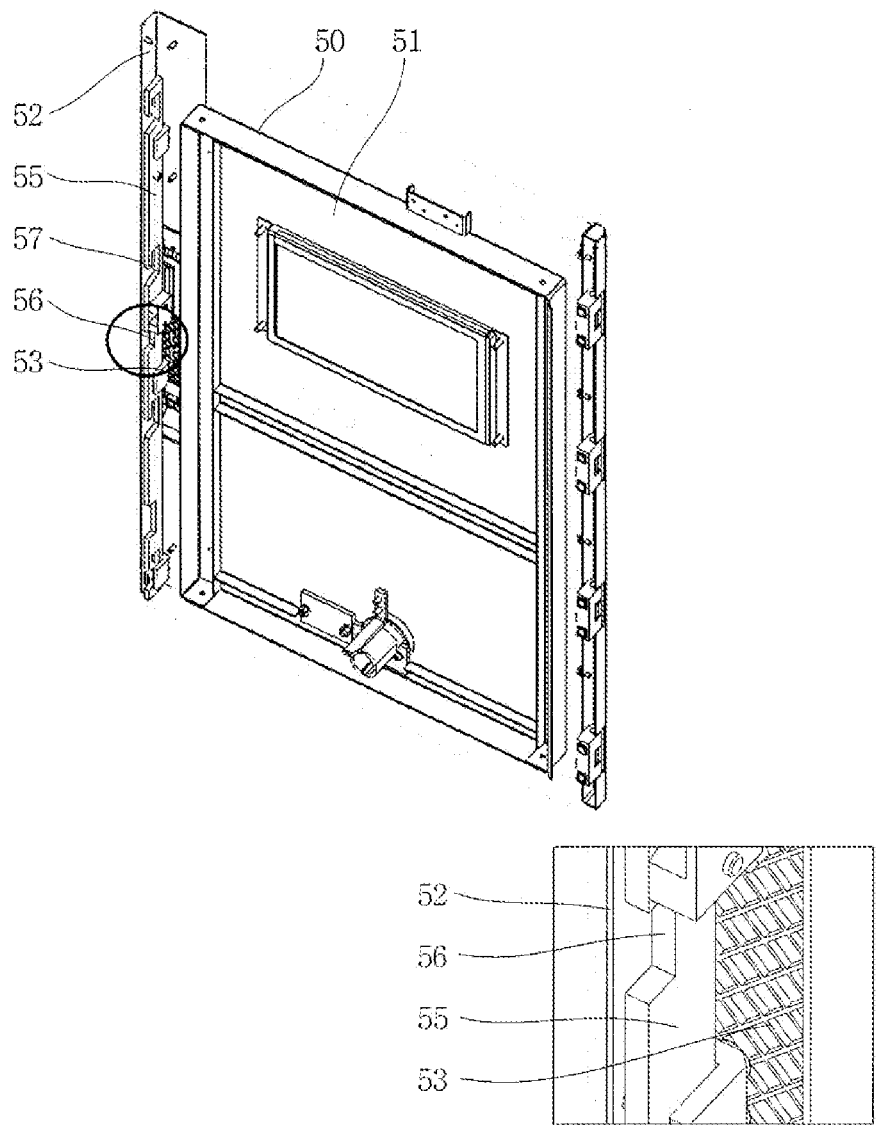
FIG. 12A is a perspective view of a door assembly in accordance with one embodiment of the present invention.
Figure 12B:
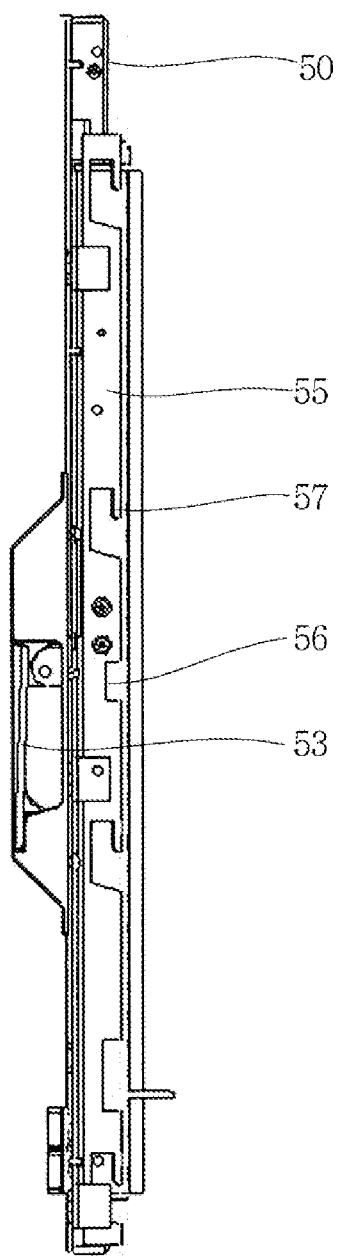
Figure 12C:
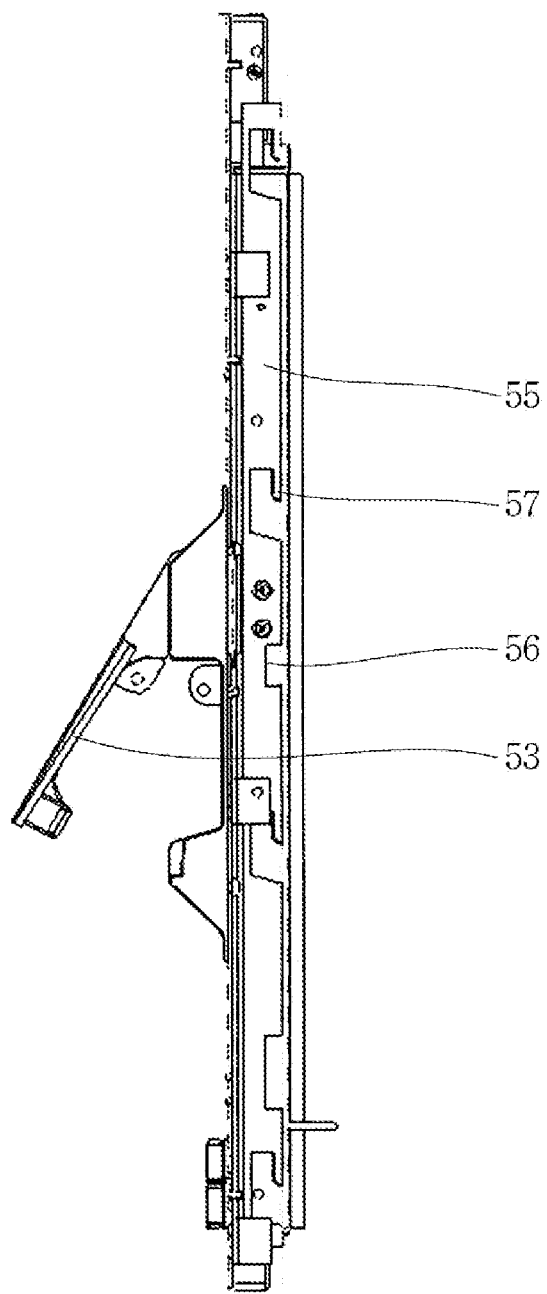

FIG. 12A is a perspective view of a door assembly in accordance with one embodiment of the present invention, and FIGS. 12B and 12C are lateral views of a door assembly in accordance with one embodiment of the present invention, in which FIG. 12B illustrates a closed state of a door handle, and FIG. 12B illustrates an open state of the door handle.

Hereinafter, description will be given in detail of a door interlock device for a vacuum circuit breaker in accordance with each embodiment of the present invention, with reference to the accompanying drawings.

A door interlock device for a vacuum circuit breaker according to one embodiment of the present invention includes a pressing unit 16 provided on one end portion of a shutter lever 15, which drives a terminal shutter 11 of a cradle 10, a driving force transfer unit 20 rotatably or slidably installed on a cradle side frame 12 to be rotatable or slidable by receiving force of the pressing unit 16, and a sliding member 30 configured to lock or unlock a door lock plate 50 by driving force transferred from the driving force transfer unit 20.

An accommodating portion 13 in which the vacuum circuit breaker main body 60 is accommodated is provided in the cradle 10 of the vacuum circuit breaker, and a cradle terminal 19 is provided on a rear surface of the cradle 10.

The terminal shutter 11 is provided to protect the cradle terminal 19 except for a case where the vacuum circuit breaker main body 60 is inserted into the cradle 10 and located at a service position.

The shutter lever 15 is provided to open and close the terminal shutter 11. The shutter lever 15 is rotatably coupled to a lever shaft 17. The shutter lever 15 may be affected by force which is applied when the vacuum circuit breaker main body 60 is inserted and comes in contact with a lever handle 15a. The shutter lever 15 is accordingly rotated centering on the lever shaft 17.

The pressing unit 16 is provided on the shutter lever 15 at an opposite side of the lever handle 15a. The pressing unit 16 may also be formed integral with the lever handle 15a. The pressing unit 16 may be configured by a part of a bolt which is perpendicularly coupled to a plate forming a body of the shutter lever 15. The bolt may be provided with a bushing or a roller. The pressing unit 16 may perform a circular motion centering on the lever shaft 17 (or a shaft recess 15b to be explained later) in response to the movement of the shutter lever 15.

The shaft recess 15b which is to be coupled to the lever shaft 17 is formed on one end portion of the shutter lever 15, and a link recess 15c to which a link connected to the terminal shutter 11 is to be coupled is formed on the other end portion of the shutter lever 15.

The driving force transfer unit 20 transfers the force generated by the pressing unit 16 to the sliding member 30 to be explained later. In addition, the driving force transfer unit 20 servers to switch an acting point and a motion direction of force.

In one embodiment for playing such role, the driving force transfer unit 20 may be configured as a link section. For example, the driving force transfer unit 20 may include a first connection member 21 and a second connection member 22.

The first connection member 21 may be configured as a rectangular plate. The first connection member 21 is provided with a pressing unit operation recess 21a in which the pressing unit 16 is movably inserted. The pressing unit operation recess 21a is formed long in a perpendicular direction. Accordingly, the pressing unit 16 may be perpendicularly movable along the pressing unit operation recess 21a.

The first connection member 21 may be provided with horizontal sliding holes for guiding a horizontal motion of the first connection member 21. The horizontal sliding holes may include two holes, namely, a first horizontal sliding hole 21b and a second horizontal sliding hole 21c. The first horizontal sliding hole 21b and the second horizontal sliding hole 21c may not be placed on the same line. The first connection member 21 is supported by supporting members 28 which are coupled to the first horizontal sliding hole 21b and the second horizontal sliding hole 21c, respectively. The supporting members 28 may be configured as bolts. The supporting members 28 coupled to the first horizontal sliding hole 21b and the second horizontal sliding hole 21c are stably coupled to the cradle side frame 12. Each supporting member 28 may be provided with a bushing 29 to reduce a friction between the first connection member 21 and the cradle side frame 12.

The first connection member 21 may be provided with a first vertical sliding hole 21d which is connected to the second connection member 22.

The second connection member 22 may be configured as a plate type bar. One end 22a of the second connection member 22 is connected to the first connection member 21, and the other end 22b of the second connection member 22 is connected to the sliding member 30 to be explained later. In detail, the one end 22a of the second connection member 22 is slidably coupled to the first horizontal sliding hole 21d of the first connection member 21, and the other end 22b of the second connection member 22 is slidably coupled to a second vertical sliding hole 22c of the sliding member 30.

The second connection member 22 is rotatably installed on the cradle side frame 12 by the rotation shaft 23. Here, the rotation shaft 23 may be located far away from the one end 22a of the second connection member 22 and close to the other end 2b of the second connection member 22. Accordingly, a turning radius of the one end 22a of the second connection member 22 that performs the circular motion is greater than a turning radius of the other end 22b of the second connection member 22. That is, the horizontal motion of the first connection member 21 is transferred to the sliding member 30 with its motion direction changed (switched) reversely and its moving length reduced.

In short, the circular motion of the pressing unit 16 is switched into the horizontal motion while passing through the first connection member 21, and the horizontal motion is transferred to the sliding member 30 with its direction switched through the second connection member 22.

In such a manner, the driving force transfer unit 20 may be implemented by any configuration, in addition to that illustrated in the embodiment, if the configuration allows the circular motion of the shutter lever 15 to be switched into a linear motion of the sliding member 30 which is located at a spaced position from the shutter lever 15.

Figure 11:
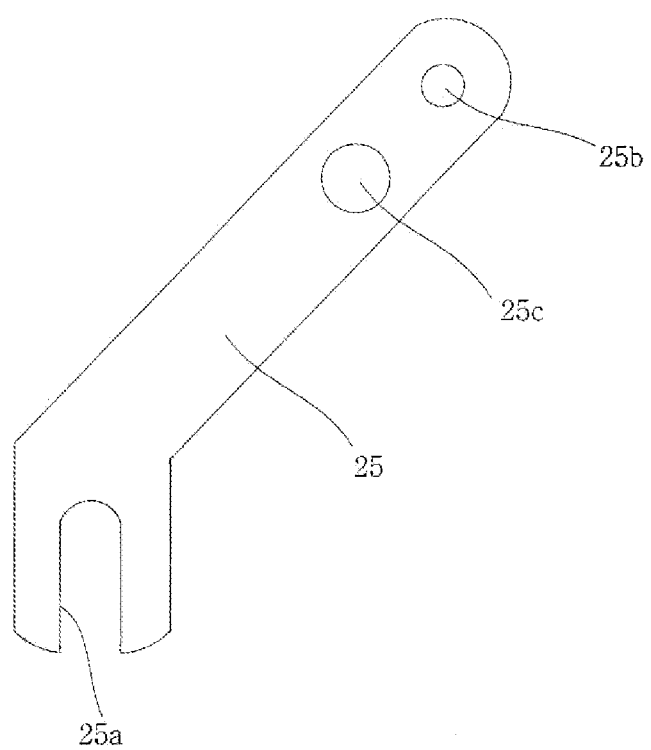
FIG. 11 is a view of a connection member in accordance with another embodiment of the present invention.

Another embodiment of the driving force transfer unit 20 is illustrated in FIG. 11. In this embodiment, the driving force transfer unit 20 may include a single connection member 25. The connection member 25 may be configured as a plate type bar. A curved portion may be formed on one end of the connection member 25. The curved portion may be provided with a pressing unit operation recess 25a in which the pressing unit 16 is operably inserted. A shaft recess 25c in which the rotation shaft 23 can be installed is formed on a part of the connection member 25. The location of the shaft recess 25c may be decided in the same manner of deciding the location of the rotation shaft 23 illustrated in relation to the second connection member 22. A coupling recess 25b to which a second horizontal sliding hole 22c of the sliding member 30 is slidably coupled is formed on the other end of the connection member 25.

The sliding member 30 may be configured as a plate type bar. A third sliding hole 30a and a fourth sliding hole 30b are formed through the sliding member 30. The sliding member 30 is supported by supporting members 38 which are coupled to the third sliding hole 30a and the fourth sliding hole 30b, respectively.

A locking piece 31 is formed on one end of the sliding member 30. The locking piece 31 may serve to lock or unlock a door lock plate 55.

A second vertical sliding hole 30c is formed through the other end of the sliding member 30. The other end 22c of the second connection member 22 is slidably coupled to the second vertical sliding hole 30c.

The door assembly 50 includes a door body 51, a door side frame 52, a door handle 53, and a door lock plate 55. The door body 51 is integrally coupled to the door side frame 52. The door lock plate 55 is slidably coupled to the door side frame 52 in a vertical direction.

The door lock plate 55 is provided with a locking recess 56, and a plurality of locking pins 57.

As illustrated in FIGS. 12B and 12C, when the door handle 53 is pulled upward (raised), the door lock plate 55 is moved up. When the door handle 53 is pushed down (dropped), the door lock plate 55 is moved down. When the door lock plate 55 is moved up in response to the door handle 53 raised, the locking pins 57 are separated from locking holes 14a of a locking guide 14, which is installed on a front portion of the cradle side frame 12. Accordingly, the door assembly 50 can be open. On the other hand, when the door lock plate 55 is moved down in response to the door handle 53 dropped, the locking pins 57 are inserted into the locking holes 14a of the locking guide 14. This may restrict the door assembly 50 from being open.

When the door lock plate 55 has been moved down in response to the door handle 53 dropped, the locking recess 56 is located at the same height with the locking piece 31 of the sliding member 30. Here, when the motion of the shutter lever 15 is transferred to the sliding member 30 as the vacuum circuit breaker main body is inserted, the locking piece 31 is inserted into the locking recess 56. Accordingly, the movement of the door lock plate 55 is locked, and thus the door assembly 50 is not open.

Hereinafter, description will be given of an operation of a door interlock device for a vacuum circuit breaker in accordance with one embodiment of the present invention, with reference to FIGS. 8A to 10B.

When the vacuum circuit breaker main body 60 is inserted into the cradle 10 to be located at the service position, the lever handle 15a of the shutter lever 15 is affected by force so as to be rotated centering on the lever shaft 17. Accordingly, the pressing unit 16 which has been inserted into the pressing unit operation recess 12a pushes back the first connection member 21. Here, a vertical motion, of the motions of the pressing unit 16, is consumed while the pressing unit 16 is vertically slid within the pressing unit operation recess 21a, and a horizontal motion thereof is applied as a force F1 pushing back the first connection member 21.

As the first connection member 21 is horizontally moved back, the one end 22a of the second connection member 22 coupled to the first vertical sliding hole 21d is pulled by the first connection member 21, and the second connection member 22 performs a circular motion in a clockwise direction centering on the rotation shaft 23. In response to the rotation of the second connection member 22, the other end 22b of the second connection member 22 also performs the circular motion. A vertical motion of the circular motion of the other end 22b of the second connection member 22 is consumed while the second connection member 22 is slid within the second vertical sliding hole 30c of the sliding member 30, and a horizontal motion thereof is applied as a force F2 pushing forward the sliding member 30.

In response to the forward movement of the sliding member 30, the locking piece 31 protrudes through a locking piece hole 12a, which is formed on a front portion of the cradle side frame 12 so as to be inserted into the locking recess 56 of the door side plate 55. Accordingly, the movement of the door side frame 55 is locked, and the opening of the door assembly 50 is prevented.

FIG. 9A illustrates a case where the vacuum circuit breaker main body 60 is located at a test position, and FIG. 9B illustrates a process of conveying the vacuum circuit breaker main body 60 to a service position. It can be noticed in FIGS. 9A and 9B that the operation of the door interlock device has been completed already at the beginning of the process of conveying the vacuum circuit breaker main body 60 to the service position.

A door interlock device for a vacuum circuit breaker according to one embodiment of the present invention may receive a driving force applied from a cradle shutter, and thus a door can automatically be locked upon an operation of inserting a circuit breaker main body. Such locking operation may be carried out immediately when the vacuum circuit breaker main body is inserted. This may prevent the door from being open even during the insertion.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A door interlock device of a cradle having a withdrawable vacuum circuit breaker, the device comprising:
    a pressing unit that is provided on one end portion of a shutter lever driving a terminal shutter of a cradle and rotates centering on a lever shaft;
    a driving force transfer unit that is installed on a cradle side frame, the driving force transfer unit performing a rotary motion or a sliding motion by a force applied from the pressing unit; and
    a sliding member that is configured to lock or unlock a door lock plate in response to a driving force transferred from the driving force transfer unit,
    wherein the driving force transfer unit comprises:
    a first connection member that is horizontally slidably coupled on the cradle side frame and shaped to include a plurality of horizontal sliding holes, wherein supporting members fixed to the cradle side frame are inserted in the horizontal sliding holes to allow the first connection member to slide horizontally in response to the force applied from the pressing unit; and
    a second connection member that is rotatably coupled on the cradle side frame, and has one end connected to the first connection member and the other end connected to the sliding member.

2. The device of claim 1, wherein the pressing unit protrudes from one side of the shutter lever, and is provided with a bushing or a roller.

3. The device of claim 1, wherein the driving force transfer unit is provided with a pressing unit operation recess in which the pressing unit is movably inserted.

4. The device of claim 1, wherein the first connection member is provided with a first vertical sliding hole to which one end of the second connection member is slidably coupled.

5. The device of claim 1, wherein the sliding member is provided with a second vertical sliding hole to which the other end of the second connection member is slidably coupled.

6. The device of claim 1, wherein the sliding member performs a linear reciprocal motion, and the door lock plate is provided with a locking recess that restricts a movement of the door lock plate when a locking piece formed on one end of the sliding member is inserted therein.

* * * * *